M. ROTTER.
MARINE POWER INSTALLATION.
APPLICATION FILED DEC. 20, 1919.
1,396,287.
Patented Nov. 8, 1921.
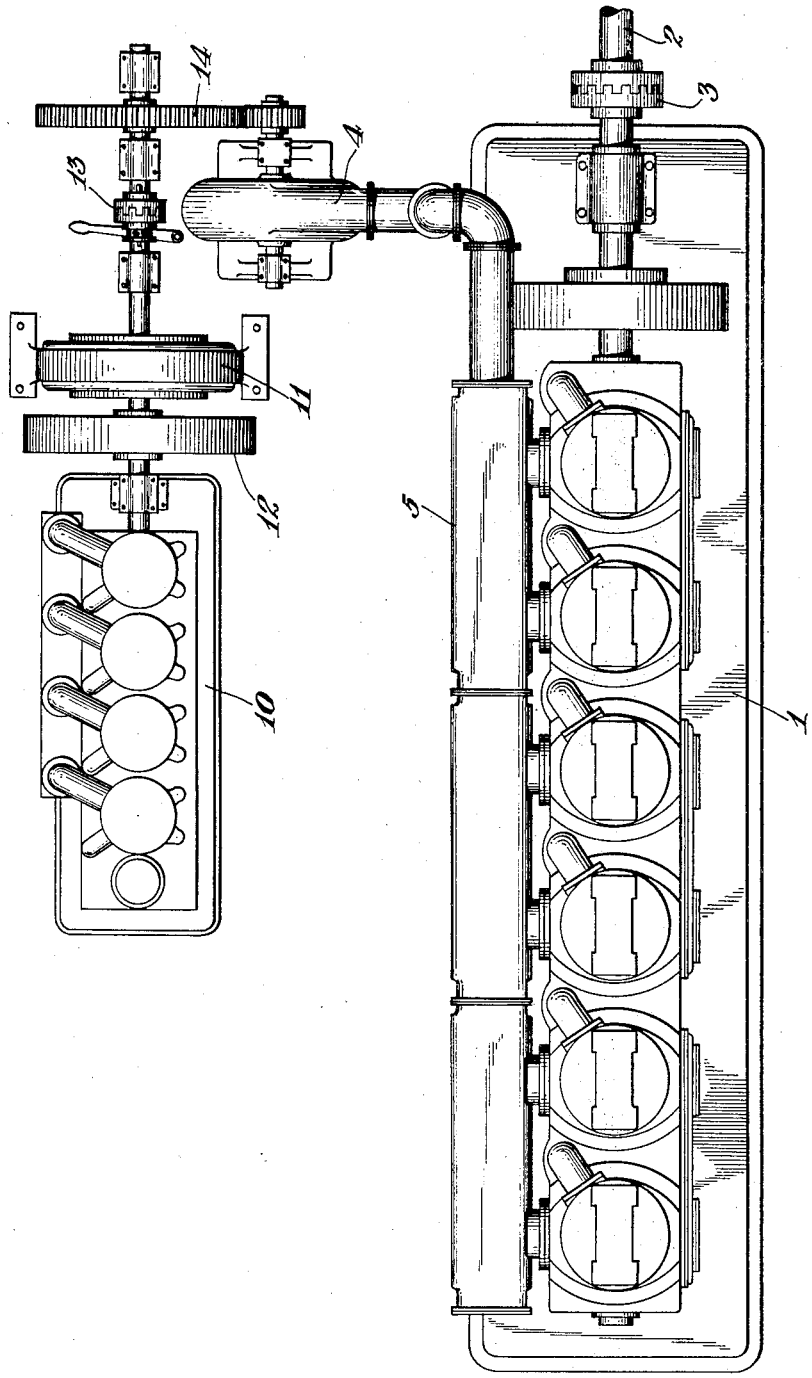

UNITED STATES PATENT OFFICE.

MAX ROTTER, OF MILWAUKEE, WISCONSIN, ASSIGNOR TO BUSCH-SULZER BROS.-DIESEL ENGINE COMPANY, OF ST. LOUIS, MISSOURI, A CORPORATION OF MISSOURI.

MARINE-POWER INSTALLATION.

1,396,287.   Specification of Letters Patent.   Patented Nov. 8, 1921.

Application filed December 20, 1919. Serial No. 346,317.

*To all whom it may concern:*

Be it known that I, MAX ROTTER, a citizen of the United States of America, residing in the city of Milwaukee, State of Wisconsin, have made certain new and useful Improvements in Marine-Power Installations, of which the following is a specification.

My invention relates to those power plant installations for ships which include an internal combustion engine as the prime mover for propelling the ship. It relates particularly to those installations in which the propelling engines are of the Diesel or fuel injection type. To simplify the description I shall therefore, for the most part, describe my invention as embodying engines of that type; the somewhat broader nature of my invention will be understood therefrom.

With Diesel engines a scavenging pump, so-called, is used for replacing the burned gases in the cylinders with air from the atmosphere for the succeeding operation of the engine. It is often desirable to separate the scavenging pump from the main propelling engine instead of building it integral with the same, and to drive the scavenging pump from an auxiliary prime mover. This auxiliary prime mover may be another internal combustion engine, a steam turbine, or indeed any prime mover suitable for the purpose. Further, it is necessary on shipboard, in most cases, to provide power for the electric hoists and other power driven auxiliaries used principally when the ship is in port. In such a ship, therefore, there are two distinct auxiliary power requirements, one to drive the scavenging pump or blower and the other to drive the electric generator for the miscellaneous power requirements about the ship. Each of these power requirements is of considerable magnitude, but the two are never used coincidentally, at least to anything like their full capacities, for the propelling engines are seldom if ever run while the hoists, etc., are being operated in port, and likewise the hoists are not operated while the propelling engines are driving the ship at sea.

The objects of my invention are to provide separate power for the blower or other device which sustains the operation of the propelling engine, and to avoid the duplication of auxiliary prime movers, thereby materially conserving the space occupied by the power plant aboard ship, where space is at a great premium, and further, reducing the cost of and amount of material in marine power plants. To this end I provide a single auxiliary prime mover of a power capacity sufficient for the demand of the scavenging pump (or other propelling engine sustaining device), or for the demand of the electric generator for the miscellaneous power requirements of the ship, whichever is the larger, but less than the capacity of the two combined; in addition I provide means whereby this single auxiliary prime mover may drive either the electric generator under load or the scavenging pump. That is, the auxiliary prime mover is arranged to drive the electrical generator and the device which sustains the operation of the propelling engine, alternately. This is possible in marine installations since at sea the auxiliary prime mover will be required to drive only the scavenging pump or at the most both the scavenging pump and the electrical generator under the small load of the current required for ship lighting; on the other hand, in port the scavenging pump may be disconnected from auxiliary engine and the full power of the auxiliary engine delivered to the electrical generator for operating the hoists, etc.

In the accompanying drawing and the following description I have illustrated and described in some detail the best embodiment of my invention of which I am now aware. The single figure of the drawing is an outline plan of such an installation as I have described above.

The propelling engine in this case is a six cylinder Diesel engine shown at 1; this engine drives the propeller shaft 2 through the usual clutch 3. The scavenging pump 4 supplies air to the engine 1 through the usual manifold 5. The scavenging pump 4 is itself driven by the auxiliary prime mover 10, which, in the instance illustrated, is an internal combustion engine either of the Diesel type or otherwise. This engine 10 is directly connected to the electrical generator 11, a common shaft being provided for both machines. If necessary or desirable a fly wheel 12 may be provided between the two machines. On an extension of the common shaft of the engine and generator is provided a clutch 13 which may be operated in any suitable manner; through this clutch the engine 10 drives the shaft carrying the gear 14 directly meshing with and driving the scavenging pump 4.

It will be understood that the scavenging pump 4 is required to sustain the operation of the propelling engine 1. At sea the clutch 13 will be so positioned as to connect the scavenging pump to the auxiliary prime mover 10, for at sea the propelling engine 1 is in operation. Little or no load is carried by the electrical generator 11 at sea, at most, generally, only the load of the current required for lighting the ship. In port, on the other hand, since the propelling engine 1 is out of operation, the clutch 13 may be opened to disconnect the blower 4 from the auxiliary prime mover 10 and the full power of the engine 10 employed for driving the generator 11, which at that time may be loaded to its capacity by the hoists and other miscellaneous power requirements about the ship.

While I have thus illustrated and described in some detail the best embodiment of my invention of which I am now aware, it will be understood that this embodiment is merely illustrative of my invention and that my invention is not limited thereto.

What I regard as my invention and desire to secure by Letters Patent of the United States is set forth in the following claims:

1. The combination of an internal combustion propelling engine, a power driven device to sustain the operation thereof, an electrical generator for miscellaneous power requirements about the ship, a second prime mover, and means for driving from said second prime mover, alternately, said electrical generator under the load of the major part of said miscellaneous power requirements and said power driven device, the whole constituting a marine installation.

2. On board ship, the combination with a fuel injection type propelling engine and its scavenging pump, of the electrical generator for the hoists and the auxiliary prime mover for the latter, the said auxiliary prime mover being arranged to operate said scavenging pump for the propelling engine.

3. The combination of a fuel injection type propelling engine, a scavenging pump therefor, an electrical generator for the power auxiliaries used in port, an auxiliary prime mover of a power delivering capacity at least equal to the power required for the operation of said generator or the pump under full load, whichever is the larger, the generator being directly connected to said auxiliary prime mover, and means for connecting said pump to said auxiliary prime mover and disconnecting the same therefrom.

4. The combination of a Diesel main engine, a scavenging pump therefor, an electrical generator to furnish current for other apparatus all or most of which is used when the main engine is not in operation, and an auxiliary prime mover of a power delivering capacity at least equal to the power required for the operation of either said generator or said pump under full load, whichever is the larger, but of power delivering capacity less than the combined full load requirement of said generator and said pump, and means for driving said electrical generator and said pump from said auxiliary prime mover.

In testimony whereof, I have signed this specification.

MAX ROTTER.